(12) United States Patent
Conti (10) Patent No.: US 9,740,887 B2
(45) Date of Patent: Aug. 22, 2017

(54) METHODS AND SYSTEMS TO RESTRICT USAGE OF A DMA CHANNEL (75) Inventor: Gregory R. Conti, Saint Paul (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2800 days.

(21) Appl. No.: 11/557,298

(22) Filed: Nov. 7, 2006

(65) Prior Publication Data

US 2007/0174507 A1    Jul. 26, 2007

(30) Foreign Application Priority Data

Dec. 23, 2005 (EP) .................................... 05292788

(51) Int. Cl.
G06F 13/28    (2006.01)
G06F 21/85    (2013.01)

(52) U.S. Cl.
CPC .................... *G06F 21/85* (2013.01)

(58) Field of Classification Search
None
See application file for complete search history.

(56) References Cited

U.S. PATENT DOCUMENTS

| 5,561,817 | A | 10/1996 | McCormack et al. |
| 5,619,727 | A | 4/1997 | Chen et al. |
| 6,496,934 | B2 * | 12/2002 | Suzuki et al. .................. 726/27 |
| 6,658,502 | B1 | 12/2003 | Story et al. |
| 6,854,039 | B1 * | 2/2005 | Strongin et al. .............. 711/163 |
| 6,883,132 | B1 * | 4/2005 | Dotson ......................... 714/774 |
| 6,898,646 | B1 | 5/2005 | Bonola et al. |
| 2004/0123013 | A1 | 6/2004 | Clayton et al. |
| 2004/0236876 | A1 * | 11/2004 | Kondratiev et al. ............ 710/22 |
| 2004/0243823 | A1 * | 12/2004 | Moyer et al. ................. 713/200 |
| 2005/0114616 | A1 | 5/2005 | Tune et al. |
| 2005/0165783 | A1 | 7/2005 | Hyser |
| 2005/0259823 | A1 | 11/2005 | Apostol, Jr. et al. |

* cited by examiner

*Primary Examiner* — Ilwoo Park
(74) *Attorney, Agent, or Firm* — Ronald O. Neerings; Charles A. Brill; Frank D. Cimino (57) ABSTRACT

In at least some embodiments, a system comprises a processor and a direct memory access (DMA) subsystem coupled to the processor. The system further comprises a component coupled to the DMA subsystem via an interconnect employing security rules, wherein, if the component requests a DMA channel, the DMA subsystem restricts usage of the DMA channel based on the security rules.

12 Claims, 7 Drawing Sheets

FROM FIG. 3A

```
...TYPE...
 IF   (MreqPrivilege = '1' AND MreqSecure = '1')
THEN DMA_CHANNEL0_INT [2] <= MDATA [2];
  ELSIF (MreqPrivilege = '0' AND MreqSecure = '1' AND MDATA [0] ='0')
THEN DMA_CHANNEL0_INT [2] <= MDATA [2];
  ELSIF (MreqPrivilege = '1' AND MreqSecure = '0' AND MDATA [1] ='0')
THEN DMA_CHANNEL0_INT [2] <= MDATA [2];
  ELSE    DMA_CHANNEL0_INT [2] <= '0';
  ENDIF;

...DEBUG...
IF MreqDebug ='0' THEN DMA_CHANNEL0_INT [3] <= MDATA [3];
ELSE                   DMA_CHANNEL0_INT [3] <= '1';
ENDIF;

DMA_CHANNEL0_INT [4] <= '1';

ELSE
...SECURITY_VIOLATION_LOCK<='1';
ENDIF;

IF (Mdata 1 = DMA_CHANNEL0_INT OR SECURITY_VIOLATION__LOCK='1')THEN

SECURITY_VIOLATION_DMA<='1';
ELSE
        SECURITY_VIOLATION_DMA <= '0';
        DMA_CHANNEL0 (4 DOWNTO 0) <= DMA_CHANNEL0_INT (4 DOWNTO 0);
        DMA_CHANNEL0_ACCESS (2 DOWNTO 0) <=
MreqDebug&MreqPrivilege&MreqSecure;
  ENDIF;
ENDIF;
```

METHODS AND SYSTEMS TO RESTRICT USAGE OF A DMA CHANNEL

BACKGROUND

Mobile electronic devices such as personal digital assistants (PDAs) and digital cellular telephones are increasingly used for electronic commerce (e-commerce) and mobile commerce (m-commerce). Programs that execute on the mobile devices to implement e-commerce and/or m-commerce functionality may need to operate in a secure mode to reduce the likelihood of attacks by malicious programs (e.g., virus programs) and to protect sensitive data.

For security reasons, at least some processors provide two levels of operating privilege: a first level of privilege for user programs; and a higher level of privilege for use by the operating system. However, the higher level of privilege may or may not provide adequate security for m-commerce and e-commerce, given that this higher level relies on proper operation of operating systems with highly publicized vulnerabilities. In order to address security concerns, some mobile equipment manufacturers implement yet another third level of privilege, or secure mode, that places less reliance on corruptible operating system programs, and more reliance on hardware-based monitoring and control of the secure mode. An example of one such system may be found in U.S. Patent Publication No. 2003/0140245, entitled "Secure Mode for Processors Supporting MMU and Interrupts."

In addition to this secure mode, various hardware-implemented security firewalls and other security monitoring components have been added to the processing systems used in mobile electronic devices to further reduce the vulnerability to attacks. Examples of these security improvements may be found in U.S. patent application Ser. No. 10/961,756, entitled "System and Method for Secure Mode for Processors and Memories on Multiple Semiconductor Dies Within a Single Semiconductor Package," Ser. No. 10/961,755, entitled "Method and System of Ensuring Integrity of a Secure Mode Entry Sequence," Ser. No. 10/961,344, entitled "System and Method of Identifying and Preventing Security Violations Within a Computing System," Ser. No. 10/961,748, entitled "Method and System of Verifying Proper Execution of a Secure Mode Entry Sequence," and European Patent Application EP 04292405.0, entitled "Method and System for Detecting a Security Violation Using an Error Correction Code," all of which are hereby incorporated by reference.

In some systems, Direct Memory Access (DMA) components are implemented to enable subsystems (e.g., a display subsystem, a camera subsystem, a modem subsystem or a processing subsystem) to communicate with each other via DMA "channels". Unfortunately, DMA channels are subject to security attacks that enable malicious hackers to break the secure mode described above without being detected by the hardware firewalls. Breaking the secure mode enables a malicious user to change a mobile electronic device's International Mobile Equipment Identity (IMEI) or defeat a Subscriber Identity Module Lock (SIMLOCK) mechanism.

SUMMARY

Accordingly, there are disclosed herein systems and methods for restricting DMA channel configurations. In at least some embodiments, a system comprises a processor and a direct memory access (DMA) subsystem coupled to the processor. The system further comprises a component coupled to the DMA subsystem via an interconnect employing security rules, wherein, if the component requests a DMA channel, the DMA subsystem restricts usage of the DMA channel based on the security rules.

In at least some embodiments, a DMA subsystem comprises a configuration firewall configured to receive DMA channel configuration requests. The DMA subsystem further comprises a violation handler coupled to the configuration firewall, wherein, if a received DMA channel configuration request violates security rules of the configuration firewall, a security violation signal is asserted by the configuration firewall to the violation handler.

In at least some embodiments, a method comprises accessing a direct memory access (DMA) subsystem. The method further comprises determining if the access is a secure mode access and, if the access is determined to be a secure mode access, allowing a DMA channel to be configured as either one of a secure channel and a public channel.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment._

Embodiments of the inventions implement a hardware security architecture that interconnects a plurality of components compatible with Direct Memory Access (DMA) techniques. As used herein, the term "hardware security architecture" is intended to mean the mechanisms and/or methodologies that connect several initiators (e.g., Advanced RISC Machine (ARM) components, Digital Signal Processor (DSP) components, Direct Memory Access DMA components, or Universal Serial Bus (USB) components) to several targets (e.g., memory components or peripherals) while complying with security rules that guarantee or at least increase the security robustness of a system. In at least some embodiments, DMA-compatible components are integrated with the hardware security architecture such that DMA channel configurations support the security rules and/or hardware constraints of the hardware security architecture.

Inasmuch as the systems and methods described herein were developed in the context of a mobile computing system, at least some of the description herein is based on a mobile computing environment. However, the discussion of the various systems and methods in relation to a mobile computing environment should not be construed as a limitation as to the applicability of the systems and methods described herein to only mobile computing environments. One of ordinary skill in the art will appreciate that these systems and methods may also be implemented in other computing environments such as desktop computers, laptop computers, network servers, and mainframe computers.

Figure 1:
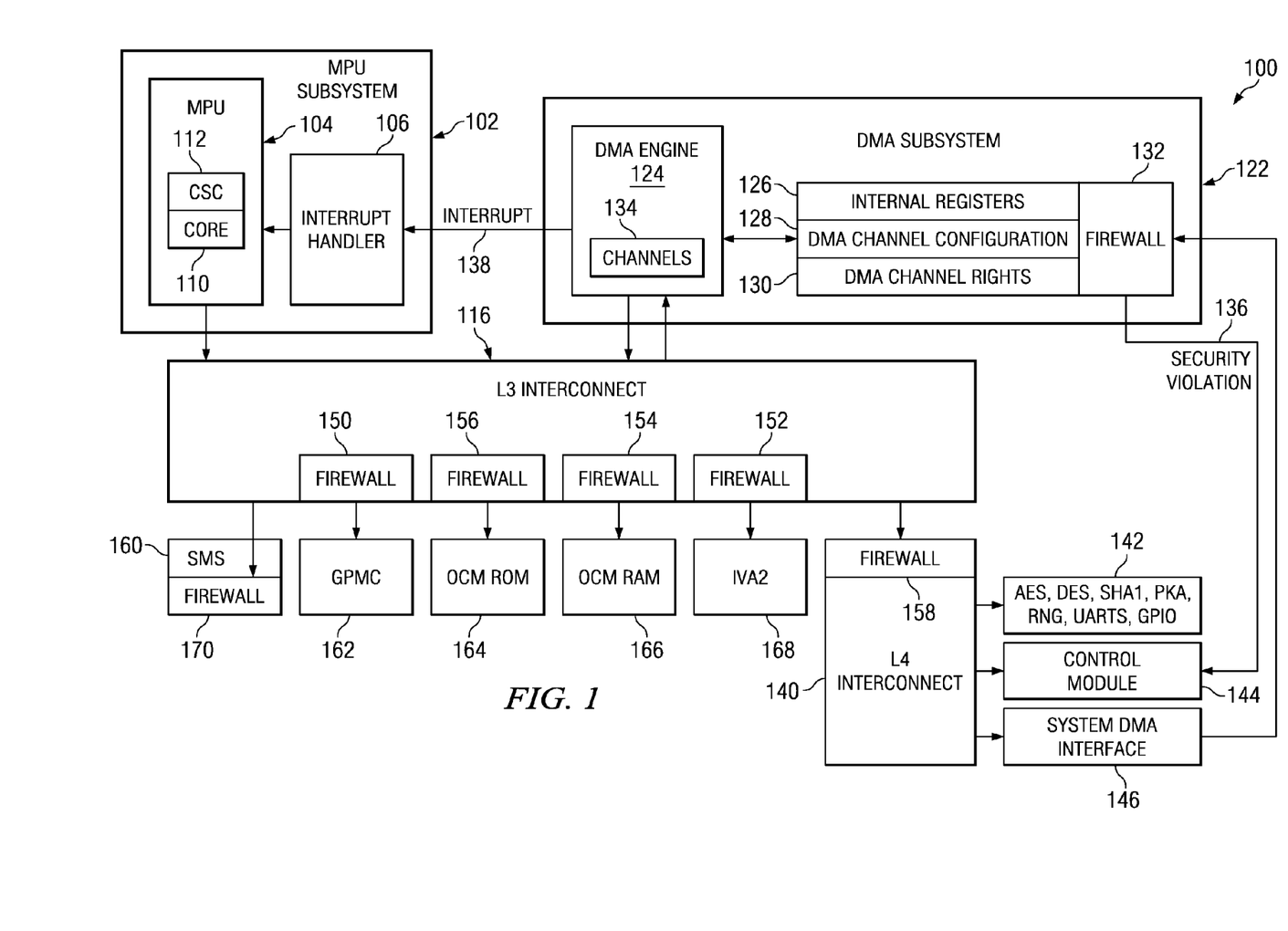
FIG. 1 shows a system in accordance with one or more embodiments.

FIG. 1 shows a system 100 in accordance with one or more embodiments of the invention. In accordance with at least some embodiments, the system 100 shows components of a mobile device such as a cellular telephone, personal digital assistant (PDA), text messaging system, or a device that combines the functionality of a messaging system, personal digital assistant and a cellular telephone.

As shown in FIG. 1, the system 100 includes a multiprocessing unit (MPU) subsystem 102 having a MPU 104 coupled to an interrupt handler 106. The MPU 104 includes a processor core 110 that executes programs and a core security controller (CSC) 112, which aids the MPU 104 in entering a secure mode for execution of secure programs on the core 110. The core 110 may be any processor suitable for integration into a system on a chip (SoC), such as the ARM 1136 series of processors. In other embodiments, the core 110 may be a processor that includes some or all of the functionality of the core security controller 112 as described herein, such as the ARM 1176 series of processors. The ARM 1136 and 1176 technology may be obtained from ARM Holdings plc of Cambridge, United Kingdom, and/or ARM, Inc. of Austin, Tex., USA.

As shown, the MPU subsystem 102 couples to a DMA subsystem 122 that enables memory accesses between DMA-compatible components ("targets") of the system 100. The DMA subsystem 122 has a DMA engine 124 with programmable DMA channels 134. The DMA subsystem 122 also has internal registers 126 such as DMA channel configuration registers 128 and DMA channel rights registers 130. The DMA channel configuration registers 128 are implemented to configure the DMA channels 134 as read channels or as read/write channels during DMA requests. The DMA channel rights registers 130 control the access rights of each DMA channel 134. As previously mentioned, these access rights are based on the security rules and/or hardware constraints of the system's hardware security architecture (e.g., as determined by interconnect qualifiers). As used herein, the term "interconnect qualifier" or "quali-fier" is intended to mean a signal embedded in an access (e.g., an Open Core Protocol (OCP) access). The qualifier reflects the state of the component that initiated the access at the time the access was initiated.

The DMA subsystem 122 also may comprise DMA status registers, source address registers, destination address registers, DMA length registers, DMA control registers, or other registers (not shown for convenience). In some embodiments, the DMA subsystem 122 is interconnected to DMA-compatible components (i.e., the source locations or destination locations) via a hardware security architecture such as an L3 interconnect 116 having firewalls 150, 152, 154, and 156 and an L4 interconnection having a firewall 158. The DMA subsystem 122 also comprises a configuration firewall 132 that allows and restricts the usage of DMA channel qualifiers as will later be described. Although the L3 interconnect 116 and the L4 interconnect 140 described herein are implemented in some embodiments, alternative embodiments may implement other existing or future interconnect architectures.

In at least some embodiments, the DMA-compatible components mentioned previously comprise a SDRAM Memory Scheduler (SMS) component 160 having a firewall 170, a General Purpose Memory Controller (GPMC) component 162, an on-chip read-only memory (ROM) 164, an on-chip random access memory (RAM) 166, and an Image Video Accelerator (IVA2) component 168. In alternative embodiments, additional components, fewer components or different DMA-compatible components may be included.

The system 100 further comprises an L4 interconnect core component 142 having logic that supports functions such as the Advanced Encryption Standard (AES), the Data Encryption Standard (DES), the Secure Hash Algorithm 1 (SHA1), Public Key Authentication (PKA), Random Number Generators (RNG), Universal Asynchronous Receiver/Transmitters (UARTs), and General Purpose Input/Outputs (GPIOs). In alternative embodiments, the L4 interconnect core component 142 may support additional functions, fewer functions or different functions. The system 100 further comprises a control module 144 that interfaces the L4 interconnect 140 to the DMA subsystem 122. As shown, the firewall 132 of the DMA subsystem 122 is configured to assert a security violation signal 136 to the control module 144 if a security violation occurs.

To comply with the system's hardware security architecture, the DMA channels 135 support usage of interconnect "qualifiers" that determine access rights to different protected memory spaces of the DMA-compatible components. Enforcement of the access rights associated with the interconnect qualifiers is based on firewalls such as the firewalls 150, 152, 154, 156, 158 and 132. In at least some embodiments, interconnect qualifiers such as "MReqType", "MReqPrivilege", "MReqDebug" and "MReqSecure" are used. Table 1 shows a definition and description of these qualifiers.

TABLE 1

| Qualifier | Definition | Description |
|---|---|---|
| MReqType | 0 Data mode<br>1 Instruction fetch mode | Indicates if an associated access request is an data access or an instruction (Opcode) fetch |
| MReqPrivilege | 0 Public mode access<br>1 Privilege mode access | Indicates if an associated access request is made in a public access mode or a privilege mode. |

TABLE 1-continued

| Qualifier | Definition | Description |
|---|---|---|
| MReqDebug | 0 Functional mode<br>1 Debug mode | Indicates if an associated access request is made in a functional mode or a debug mode |
| MReqSecure | 0 Normal transaction mode<br>1 Secure transaction mode | Indicates if an associated access request is part of a normal transaction or a secure transaction |

If present, the MReqType qualifier shown in Table 1 comprises a logic "0" or "1". If the MReqType qualifier=0, an access request (channel configuration request) associated with the MReqType qualifier is part of a data access mode that transfers data to a non-executable memory space. If the MReqType qualifier=1, an access request associated with the MReqType qualifier is part of an instruction (Opcode) access mode that transfers data to an executable memory space.

If present, the MReqPrivilege qualifier comprises a logic "0" or "1". If the MReqPrivilege qualifier=0, an access request (channel configuration request) associated with the MReqPrivilege qualifier is a user mode access. If the MReqPrivilege qualifier=1, an access request associated with the MReqPrivilege qualifier is a privilege mode access. For example, in embodiments that implement ARM components, a plurality of privilege mode accesses are possible such as a "supervisor" mode access, a "system" access, an "interrupt request" (IRQ) access, a "fast interrupt request" (FIQ) access, an "abort" access, an "undefined" access or a "monitor" access. A privilege mode access enables operations that are not available to user mode accesses.

If present, the MReqDebug qualifier comprises a logic "0" or "1". If the MReqDebug qualifier=0, the access request (channel configuration request) associated with the MReqDebug qualifier is a functional mode access. If the MReqDebug qualifier=1, the access request associated with the MReqDebug qualifier is a debug mode access. In at least some embodiments, the functional mode involves executing instructions using a processor and the debug mode involves executing instructions using an emulator.

If present, the MReqSecure qualifier comprises a logic "0" or "1". If the MReqSecure qualifier=0, an access request (channel configuration request) associated with the MReqSecure qualifier is a normal transaction mode access. If the MReqSecure qualifier=1, an access request associated with the MReqSecure qualifier is a secure transaction mode access. Qualifiers may be used together or separately to enable a variety of access rights. For more information regarding the use and enforcement of interconnect qualifiers, reference may be made to European Pat. App. No. EU 05 291 479.3, filed on Jul. 7, 2005 and entitled "Method and System For a Multi-Sharing Security Firewall", which is herein incorporated by reference.

While one or more of the previously described qualifiers are implemented in some embodiments, other embodiments may implement different qualifiers. The qualifiers MReqType, MReqPrivilege, MReqDebug and MReqSecure are simply used for convenience in describing embodiments that implement ARM components. However, these qualifiers should also be understood as being applicable to any system with different modes and different security levels. To support the different security levels, the DMA channels 134 are configured based on the different interconnect qualifiers. The DMA channel configuration process may occur once, periodically, or randomly (as needed).

In the embodiment of FIG. 1, the configuration firewall 132 is implemented to allow or restrict certain qualifiers on the DMA channels 134. The firewall 132 is accessible and the DMA channels 134 are configurable (or re-configurable) via the L4 interconnect 140. In some embodiments, the MPU 104 accesses the firewall 132 via the L4 interconnect 140 to configure the DMA channels 134. If the MPU 104 attempts to perform a DMA channel configuration that is not allowed (e.g., some channel configurations may be "locked"), in-band errors are sent back to the initiator that accessed the firewall 132 (e.g., the MPU 104) and out-band errors (e.g., the security violation signal 136) are generated to the control module 144 and later converted into an MPU interrupt 138. As used herein, "in-band errors" refer to errors that are embedded in a response transaction to the initiator. For example, a response transaction may include status information such as an "OK" indicator or a "FAIL" indicator that is returned to the initiator. As used herein, "out-band errors" refer to errors that are out of the initiator execution flow. For example, the firewalls may generate error signals that are outside the initiator execution flow. The out-band errors can be used to update status registers and/or to cause an interrupt such as the MPU interrupt 138 previously mentioned. The MPU interrupt 138 can be used to notify a user of the system 100, to disable one or more functions of the system 100, or to perform some other action in response to a security violation. For more information regarding detecting and responding to security violations, reference may be made to U.S. patent application Ser. No. 10/961,344, filed on Oct. 8, 2004 and entitled "System and Method of Identifying and Preventing Security Violations Within a Computing System", which is herein incorporated by reference.

Figure 2:
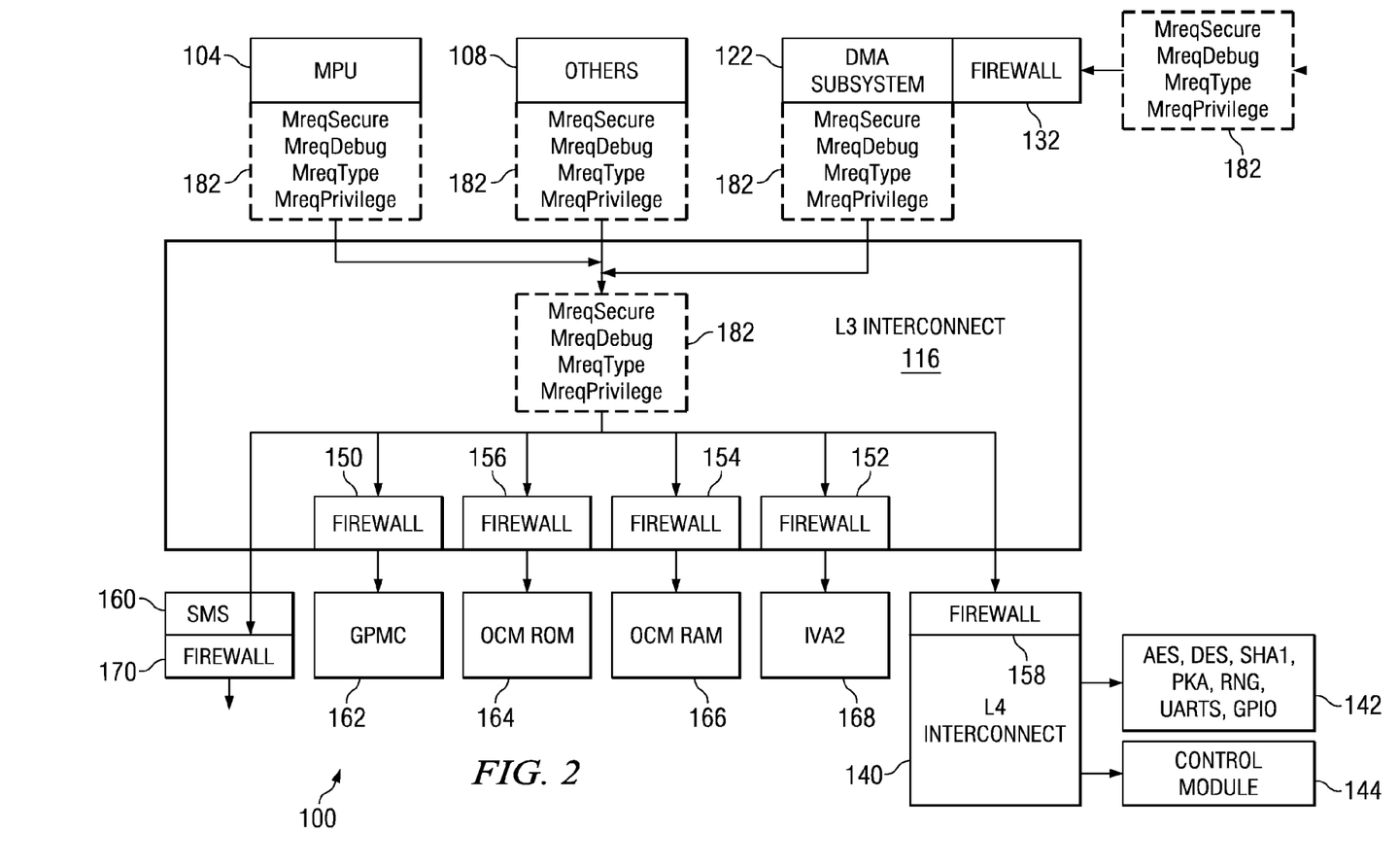
FIG. 2 shows the system of FIG. 1 with qualifiers in accordance with one or more embodiments.

FIG. 2 shows the system 100 of FIG. 1 with qualifiers in accordance with one or more embodiments. As shown in FIG. 2, the qualifiers (e.g., MReqType, MReqPrivilege, MReqDebug and MReqSecure) are represented by block 182. In at least some embodiments, the MPU 104 issues access requests or transactions with the qualifiers 182 to the L3 interconnect 116. Additionally or alternatively, other components 108 (e.g., Digital Signal Processors (DSPs), modems, or videos accelerators (IVA2)) are able to issue access requests or transactions with the qualifiers 182 to the L3 interconnect 116 (i.e., the MPU 104 does not necessarily issue all access requests or transactions). These access requests or transactions along with the qualifiers 182 are propagated through the L4 interconnect 140 to the firewall 132 of the DMA subsystem 122. The function of the firewall 132 is shown in FIGS. 3A-3B in greater detail.

Figure 3A:
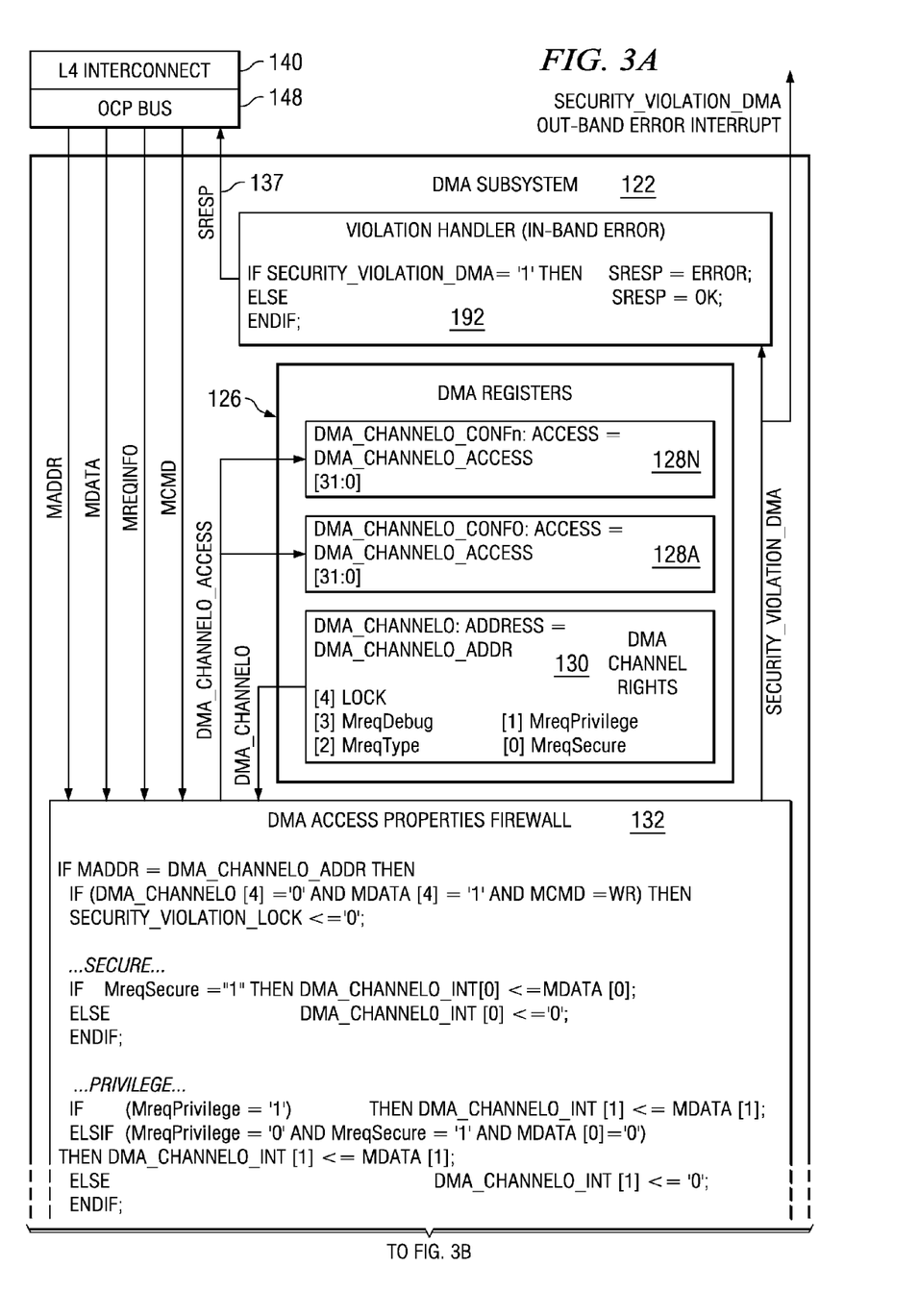
FIGS. 3A-3B show a DMA subsystem in accordance with one or more embodiments.
Figure 3B:
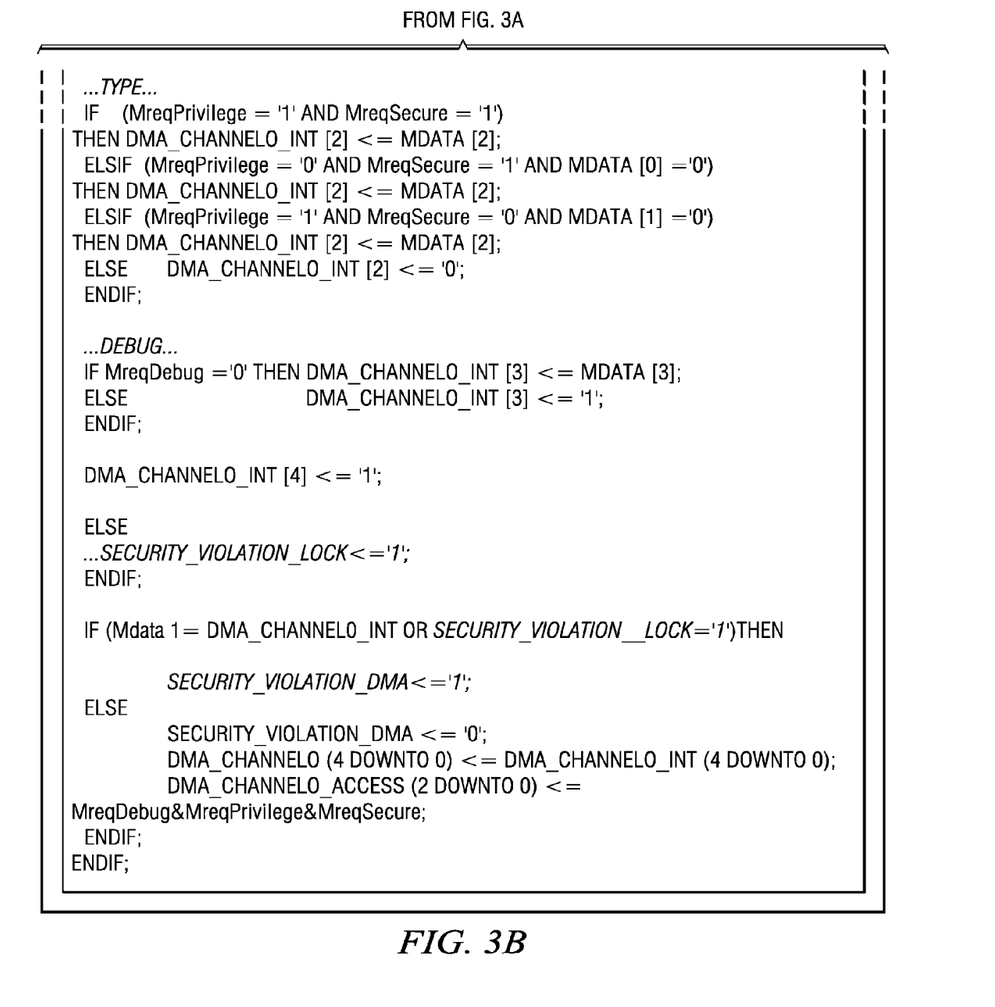

FIGS. 3A-3B show a DMA subsystem 122 in accordance with one or more embodiments. In FIGS. 3A-3B, the DMA subsystem 122 comprises the firewall 132 which, in some embodiments, couples to the L4 interconnect 140 via an on-chip protocol (OCP) bus 148. As shown, the firewall 132 receives an address signal "MADDR", a data signal "MDATA", qualifier bits signals "MREQINFO", and a command signal "MCMD" from the L4 interconnect 140. In some embodiments, the MREQINFO signals include the qualifiers MReqSecure, MReqPrivilege, MReqType, and MReqDebug as will later be described.

The MADDR, MDATA, MREQINFO, and MCMD signals are representative of access requests or transactions that are issued by the MPU 104 or other components 108 that support the system's hardware security architecture. The firewall 132 uses these signals to configure DMA channel 0 for use with a given access request or transaction or to assert the security violation signal 136. The function of the firewall 132 with respect to DMA channel 0 is illustrated using pseudo-code. The pseudo-code represents software, firmware, or hardware functions of the firewall 132 in response to the MADDR, MDATA, MREQINFO, and MCMD signals and the contents of the DMA registers 126. The function of the firewall 132, in accordance with at least some embodiments, is additionally or alternatively described hereafter.

The security violation signal 136 is used to generate in-band errors and/or out-band errors. For example, in some embodiments, the violation handler 192 receives the security violation signal 136 from the firewall 132 and asserts an in-band error "SRESP" 137 to the initiator that accessed the firewall 132 (via the L4 interconnect 140). Any out-band error generated due to the security violation signal 136 may be converted into an MPU interrupt 138 that enables the system 100 to appropriately handle the security violation.

As shown in FIG. 3A, DMA subsystem 122 also comprises DMA registers 126 that support the configuration and access rights of DMA channels 0 to "n". Specifically, FIGS. 3A-3B illustrate DMA registers associated with DMA channel 0. In other words, the DMA channel configuration registers 128A-128N and DMA channel rights register 130 are associated with DMA channel 0. Additional DMA registers associated with DMA channels 1 to n are not shown for convenience. Accordingly, parts of the description herein focus on one channel (DMA channel 0), though the discussion should be understood as applying to other channels as well. Also, other logic besides registers could be implemented in some embodiments. Using registers is simple one way to configure DMA channels to support the different security levels of the system 100. Table 2 shows a summary of DMA registers 126 in accordance with some embodiments.

TABLE 2

| | | | | | |
|---|---|---|---|---|---|
| Offset | Register Name | Description | Size | Access | |
| | | DMA CHANNEL n | | | |
| | | | | DMA_CHANNELn_ACCESS | |
| | | | | = MReqDebug, MReqPrivilege, MReqType, MReqSecure | != |
| N/A | DMA_CHANNELn_CONFn | Configure CHANNELn | 32 | R/W | R |
| N/A | DMA_CHANNELn_CONF1 | Configure CHANNELn | 32 | R/W | R |
| N/A | DMA_CHANNELn_CONF0 | Configure CHANNELn | 32 | R/W | R |
| | | | | DMA_CHANNELn.LOCK | |
| | | | | 0 | 1 |
| N/A | DMA_CHANNELn | Configure CHANNELn rights | 5 | R/W | R |
| | | DMA CHANNEL 1 | | | |
| | | | | DMA_CHANNEL1_ACCESS | |
| | | | | = MReqDebug, MReqPrivilege, MReqType, MReqSecure | != |
| N/A | DMA_CHANNEL1_CONFn | Configure CHANNEL1 | 32 | R/W | R |
| N/A | DMA_CHANNEL1_CONF1 | Configure CHANNEL1 | 32 | R/W | R |
| N/A | DMA_CHANNEL1_CONF0 | Configure CHANNEL1 | 32 | R/W | R |
| | | | | DMA_CHANNEL1.LOCK | |
| | | | | 0 | 1 |
| N/A | DMA_CHANNEL1 | Configure CHANNEL1 rights | 5 | R/W | R |
| | | DMA CHANNEL 0 | | | |
| | | | | DMA_CHANNEL0_ACCESS | |
| | | | | = MReqDebug, MReqPrivilege, MReqType, MReqSecure | != |
| N/A | DMA_CHANNEL0_CONFn | Configure CHANNEL0 | 32 | R/W | R |
| N/A | DMA_CHANNEL0_CONF1 | Configure CHANNEL0 | 32 | R/W | R |
| N/A | DMA_CHANNEL0_CONF0 | Configure CHANNEL0 | 32 | R/W | R |
| | | | | DMA_CHANNEL0.LOCK | |
| | | | | 0 | 1 |
| N/A | DMA_CHANNEL0 | Configure CHANNEL0 rights | 5 | R/W | R |

As shown in Table 2, a plurality of DMA channels (e.g., channels 0 to n) are illustrated. For each channel, parameters such as offset, register name, description, size and access are described. For example, the DMA channel 0 is associated with a plurality of configuration registers 128A-128N having the names "DMA_CHANNEL0_CONF0" to "DMA_CHANNEL0_CONFn". These configuration registers enable read or read/write operations on DMA channel 0. For example, if an access request or transaction on the DMA channel 0 includes a MreqDebug, MReqPrivilege, MReqType or MReqSecure qualifier, the DMA channel (e.g., DMA channel 0) is configured for read/write operations. Otherwise, the DMA channel 0 is configured for read operations only. In some embodiments, the MReqType qualifier is not used to configure the channel configuration registers 128A-128N and the DMA channel rights register 130, but is provided during DMA channel operations by the DMA subsystem 122 to distinguish between data accesses intended to store data in a non-executable memory space and instruction accesses intended to store data in an executable memory space. Table 3 shows a summary of bits in a DMA_CHANNEL0_CONFn register in accordance with some embodiments.

TABLE 3

| Bit | Field Name | Function DMA_CHANNEL0_CONFn | Reset Value | Access DMA_CHANNEL0_ACCESS = MreqDebug, MReqPrivilege, MReqType, MreqSecure | != |
|---|---|---|---|---|---|
| 31:0 | DMA_CHANNEL0_CONFn | Configure DMA CHANNEL0 | 0x0 | R/W | R |

In Table 3, DMA_CHANNEL_CONFn register parameters such as bits, field name, function, reset value and access are illustrated. In at least some embodiments, the DMA_CHANNEL0_CONFn register is a 32-bit register. The DMA_CHANNEL0_CONFn register is configured such that if an access request or transaction on the DMA channel 0 includes a MreqDebug, MReqPrivilege, MReqType or MReqSecure qualifier, the DMA channel 0 allows read/write operations. Otherwise, the DMA channel 0 allows read operations only. As shown, the DMA_CHANNEL0_CONFn register may have a reset value 0x0.

The access rights of DMA channel 0 (i.e., the memory spaces that can be accessed by DMA channel 0) are set by a DMA channel rights register 130 (named "DMA_CHANNEL0"). As shown, the DMA_CHANNEL0 register controls the access rights based on data bits which correspond to qualifiers such as MReqType, MReqPrivilege, MReqDebug and MReqSecure. The DMA_CHANNEL0 register also controls a lock bit which enables/disables the qualifier bits associated with DMA_CHANNEL0 qualifier bits from being modified. In other words, if the lock bit "DMA_CHANNEL0.LOCK"=0, the qualifier bits associated with DMA_CHANNEL0 are modifiable via a read/write operation. If DMA_CHANNEL0.LOCK=1, the qualifier bits associated with DMA_CHANNEL0 are locked or non-modifiable. In some embodiments, locked qualifier bits can still be read. Table 4 shows a summary of bits in the DMA_CHANNEL0 register in accordance with some embodiments.

TABLE 4

| Bit# | Field Name | Function DMA_CHANNEL0 | Reset Value | Access LOCK = 0 | LOCK = 1 |
|---|---|---|---|---|---|
| 31:5 | RESERVED | RESERVED | 0x0 | R | R |
| 4 | LOCK | LOCK this register | 0 | R/W | R |
| 3 | MreqDebug | Issue MreqDebug on DMA transaction | 0 | R/W | R |
| 2 | MreqType | Issue MreqType on DMA transaction | 0 | R/W | R |
| 1 | MreqPrivilege | Issue MreqPrivilege on DMA transaction | 0 | R/W | R |
| 0 | MreqSecure | Issue MreqSecure on DMA transaction | 0 | R/W | R |

In Table 4, DMA_CHANNEL0 register bits such as bit#, field name, function, reset value and access are illustrated. Bit 0 corresponds to an MReqSecure qualifier bit. If the MReqSecure bit is set to 0, the DMA channel 0 is a public channel. In some embodiments, the MReqSecure bit can be set to 0 if the access to program the DMA channel 0 is made by a public user access, a public privilege access, a secure user access or a secure privilege access. If the MReqSecure bit is set to 1, the DMA channel 0 is a secure channel. In some embodiments, the MReqSecure bit can only be set to 1 if the access to program the DMA channel 0 is made by a secure user access or a secure privilege access. If a public user access or public privilege access attempts to program the DMA channel 0 as a secure channel, the action is discarded or is otherwise nullified.

Bit 1 corresponds to a MReqPrivilege bit (or "privilege" bit). If the MReqPrivilege bit is set to 0, the DMA channel 0 is a public user channel. In some embodiments, the MReqPrivilege bit can be set to 0 if the access to program the DMA channel 0 is made by a public user access, a public privilege access, a secure user access or a secure privilege access. If the MReqPrivilege bit is set to 1, the DMA channel 0 is a privilege channel. In embodiments that implement ARM components, some examples of privilege channels include "supervisor" channels, a "system" channels, an "interrupt request" (IRQ) channels, "fast interrupt request" (FIQ) channels, "abort" channels, "undefined" channels or "monitor" channels. Alternative embodiments could, of course, implement other privilege channels and qualifiers. A privilege channel enables operations that are not available to public user channels.

In some embodiments, the MReqPrivilege bit can be set to 1 if the access to program the DMA channel 0 is made by a public privilege access and if the DMA channel 0 is a public channel (i.e., MReqSecure=0). If the DMA channel 0 is a secure (non-public) channel (i.e., MReqSecure=1), the MReqPrivilege bit can be set to 1 if the access to program the DMA channel 0 is made by a secure user access or a secure privilege access. If a public user access attempts to program the DMA channel 0 as a public privilege channel, a secure user channel or a secure privilege channel, the action is discarded or is otherwise nullified. Additionally or alternatively, if a secure user access attempts to program the DMA channel 0 as a secure privilege channel, the action is discarded or is otherwise nullified.

In some embodiments, both the MReqPrivilege and MReqSecure bits are used. In such embodiments, these bits allow the DMA channel 0 to be configurable as a public user channel, a public privilege channel, a secure user channel or a secure privilege channel. For example, if both the MReqSecure and MReqPrivilege bits are set to 0, the DMA channel 0 is a public user channel. If the MReqSecure bit is set to 0 and the MReqPrivilege bit is set to 1, the DMA channel 0 is a public privilege channel. If the MReqSecure bit is set to 1 and the MReqPrivilege bit is set to 0, the DMA channel 0 is a secure user channel. The rules previously described regarding which accesses can configure DMA channel 0 as a public user channel, a public privilege channel, or a secure user channel apply.

If both the MReqSecure and MReqPrivilege bits are set to 1, the DMA channel 0 is a secure privilege channel. In some embodiments, both the MReqSecure and MReqPrivilege bits can only be set to 1 (simultaneously) if the access to program the DMA channel 0 is made by a secure privilege access.

Bit 2 corresponds to a MReqType qualifier bit. This qualifier bit can be used together with the MReqSecure and MReqPrivilege bits. If the MReqType bit is set to 0, the DMA channel 0 is a data access channel, intended for transferring data to a non-executable memory space (e.g., a peripheral or a memory data buffer) by an initiator. In some embodiments, the MReqType bit can be set to 0 for use with a public user access, a public privilege access, a secure user access or a secure privilege access. If the MReqType bit is set to 1, the DMA channel 0 is an instruction channel, intended for transferring data to an executable memory space by an initiator. For example, the DMA channel 0 may be a public user instruction channel, a public privilege instruction channel, a secure user instruction channel or a secure privilege instruction channel. The type of instruction channel depends on the other qualifier bits (e.g., if MReqType=1, MReqSecure=1 and MReqPrivilege=1, channel 0 is a secure privilege instruction channel). As previously mentioned, in some embodiments, the MReqType qualifier is not used to configure DMA channels, but is provided during DMA transactions to distinguish between data that is intended to be stored in non-executable memory space and data that is intended to be stored in executable memory space.

In some embodiments, DMA channel 0 can be set as a public user instruction channel only if the access to program the DMA channel 0 is made by a public privilege access, a secure user access or a secure privilege access. The DMA channel 0 can be set as a public privilege instruction channel only if the access to program the DMA channel 0 is made by a secure user access or a secure privilege access. The DMA channel 0 can be set as a secure user instruction channel only if the access to program the DMA channel 0 is made by a secure privilege access. The DMA channel 0 can be set as a secure privilege instruction channel only if the access to program the DMA channel 0 is made by a secure privilege access. If an access attempts to use to a DMA channel improperly (e.g., if a secure user access attempts to use the DMA channel 0 as secure user instruction channel), the action is discarded or is otherwise nullified. In some embodiments, using the DMA channel 0 as an instruction channel requires a higher security level than using the DMA channel 0 as a data access channel. For example, a secure user access is able to use the DMA channel 0 as a secure user channel (for data access), but is not able to use the DMA channel 0 as a secure instruction channel (i.e., only a secure privilege access is able to use the DMA channel as a secure user instruction channel).

Bit 3 corresponds to a MReqDebug qualifier bit. If MReqDebug=0, the DMA channel 0 is a functional (application) channel. If MReqDebug=1, the DMA channel 0 is a debug channel. As previously mentioned, the functional mode may involve executing instructions using a processor and the debug mode may involve executing instructions using an emulator. In some embodiments, the DMA channel 0 is able to be configured as a functional channel only if the access to program DMA channel 0 is a functional access (e.g., in a secure mode, accesses issued by authorized software such as the secure kernel is considered a functional access). The DMA channel 0 is able to be configured as a debug channel by a debug access or a functional access. However, if a debug access attempts to configure channel 0 as a functional channel, the action is discarded or is otherwise nullified.

Bit 4 corresponds to a lock bit. If the lock bit=0, the qualifier bits (bits 0-3) are modifiable using a read/write operation. If the lock bit=1, the qualifier bits are "locked" or are non-modifiable (but may still be readable). In some embodiments, the lock bit may be set to 0 before a DMA channel is configured or after a DMA channel operation is completed. The lock bit may be set to 1 after the DMA channel rights of a given DMA channel are successfully configured in preparation of a DMA channel operation. Once a DMA channel is successfully configured, the qualifiers of the accesses that made the configuration are recorded and used to allow full programming of the DMA channel by setting DMA parameters such as source address, destination address or other parameters. After the DMA channel operation has started, the DMA subsystem 122 uses (e.g., generates as necessary) the qualifiers set in the channel rights register 130 to issue transactions on the hardware security architecture. The lock bit should be set to 1 throughout the DMA channel operation to ensure that changes are not made to DMA channel's configuration or access rights during the DMA channel operation. When a DMA channel operation is completed, the DMA channel configuration registers 128 and DMA channel rights registers 130 related to the completed DMA channel operation are cleared (set to 0). As shown, bits 5-31 of the DMA_CHANNEL0 register are reserved for future use.

Figure 4:
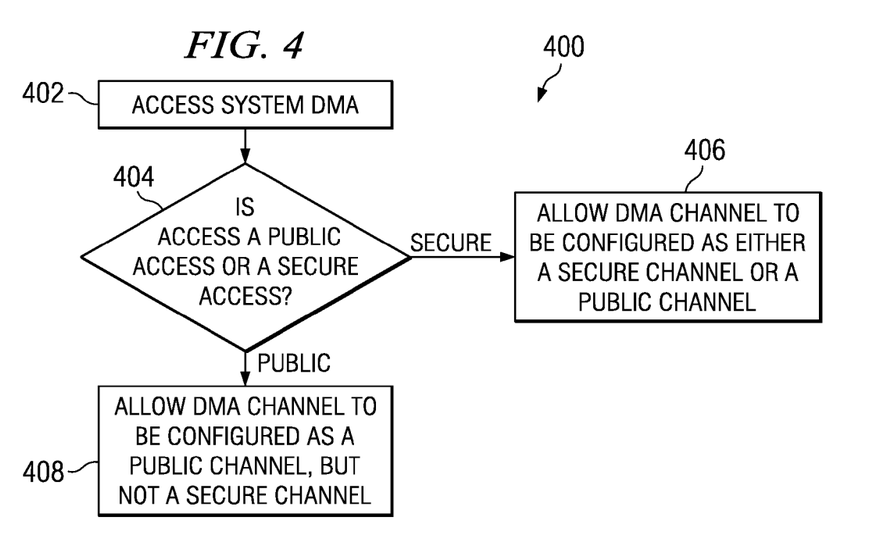
FIGS. 4, 5, 6, 7, 8 and 9 show methods of restricting DMA channel configurations in accordance with one or more embodiments.

FIGS. 4, 5, 6, 7, 8 and 9 show methods of restricting DMA channel configurations in accordance with one or more embodiments. As shown in FIG. 4, a method 400 comprises accessing a system DMA (block 402). If the access is determined to be a public access (determination block 404), the method 400 allows a DMA channel to be configured as a public channel, but not a secure channel (block 408). If the access is determined to be a secure access (determination block 404), the method 400 allows a DMA channel to be configured as either a secure channel or a public channel (block 406).

Figure 5:
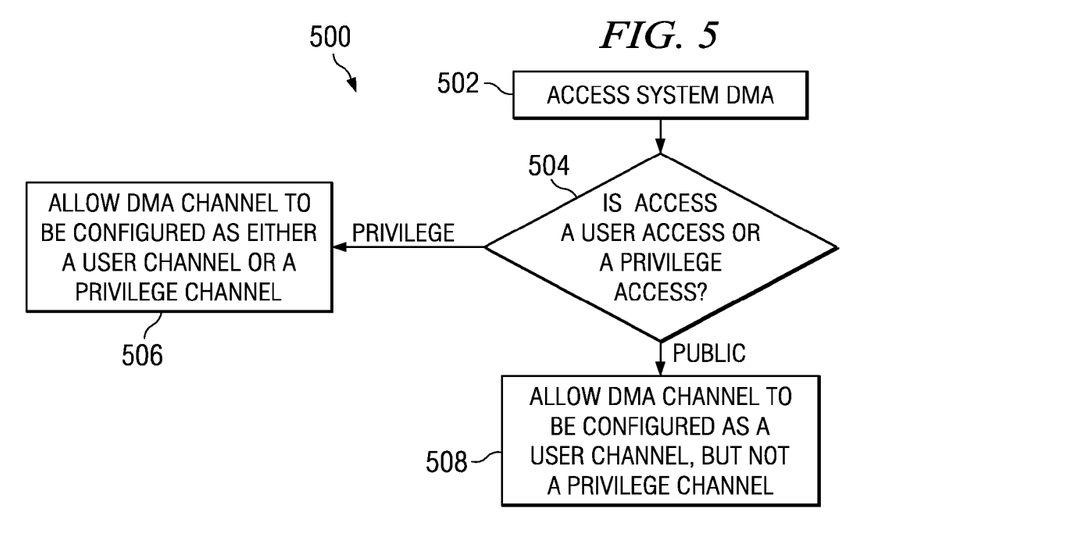

As shown in FIG. 5, a method 500 comprises accessing a system DMA (block 502). If the access is determined to be a user access (determination block 504), the method 500 allows a DMA channel to be configured as a user channel, but not a privilege channel (block 508). For example, the user access may be a public user access or a secure user access. If the access is determined to be a privilege access (determination block 504), the method 500 allows a DMA channel to be configured as either a privilege channel or a user channel (block 506). For example, if the access is a public privilege access, the method 500 allows a DMA channel to be configured as either a public privilege channel or a public user channel. If the access is a secure privilege access, the method 500 allows a DMA channel to be configured as either a secure privilege channel, a public privilege channel, a secure user channel or a public user channel.

Figure 6:
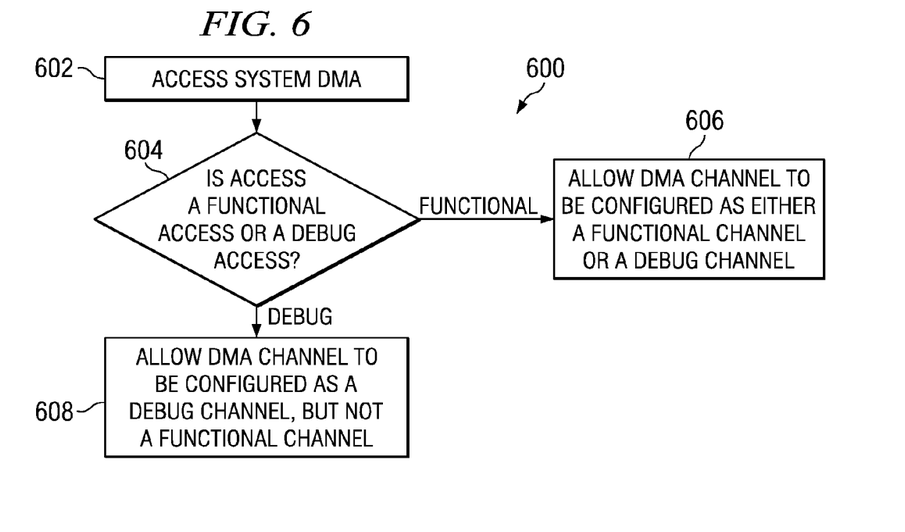

As shown in FIG. 6, a method 600 comprises accessing a system DMA (block 602). If the access is determined to be a debug access (determination block 604), the method 600 allows a DMA channel to be configured as a debug channel, but not a functional channel (block 608). If the access is determined to be a functional access (determination block 604), the method 600 allows a DMA channel to be configured as either a functional channel or a debug channel (block 606).

Figure 7:
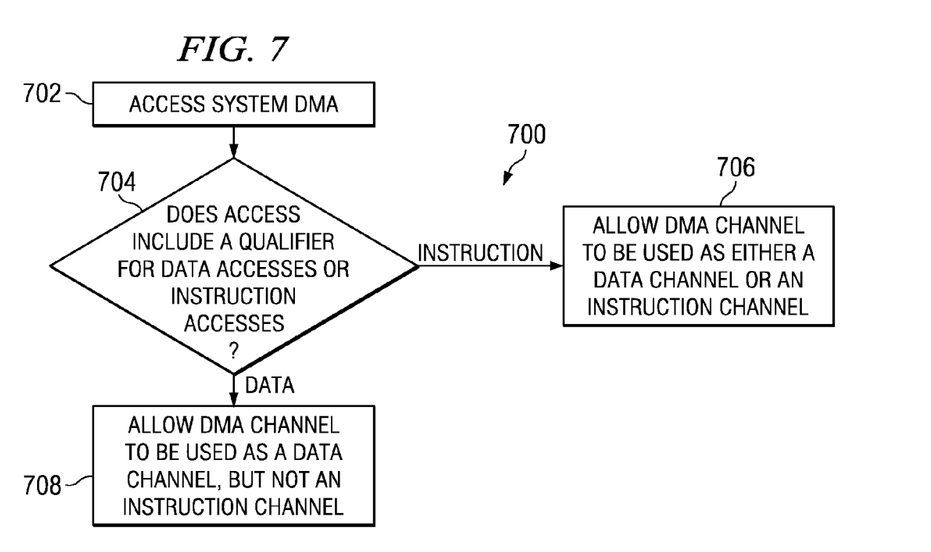

As shown in FIG. 7, a method 700 comprises accessing a system DMA (block 702). If the access includes a qualifier for data accesses (determination block 704), the method 700 allows a DMA channel to be used as a data channel, but not an instruction channel (block 708). If the access includes a qualifier for instruction accesses (determination block 704), the method 700 allows a DMA channel to be used as either a data channel or an instruction channel (block 706).

Figure 8:
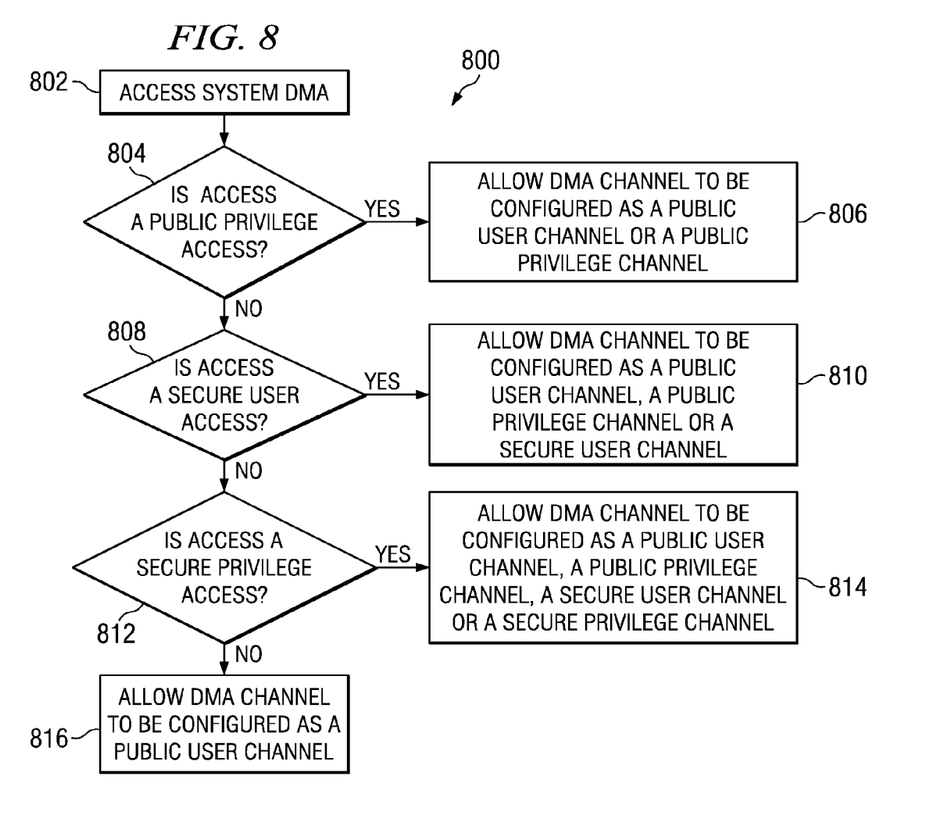

As shown in FIG. 8, a method 800 comprises accessing a system DMA (block 802). If an access is determined to be a public privilege access (determination block 804), the method 800 allows a DMA channel to be configured as a public user channel or a public privilege channel (block 806). If an access is determined to be a secure user access (determination block 808), the method 800 allows a DMA channel to be configured as a public user channel, public privilege channel or a secure user channel (block 810). If an access is determined to be a secure privilege access (determination block 812), the method 800 allows a DMA channel to be configured as a public user channel, a public privilege channel, a secure user channel or a secure privilege channel (block 814). If an access is determined to be neither a public privilege access, a secure user access, or a secure privilege access (determination blocks 804, 808, 812), the method 800 allows a DMA channel to be configured as a public user channel (block 816).

Figure 9:
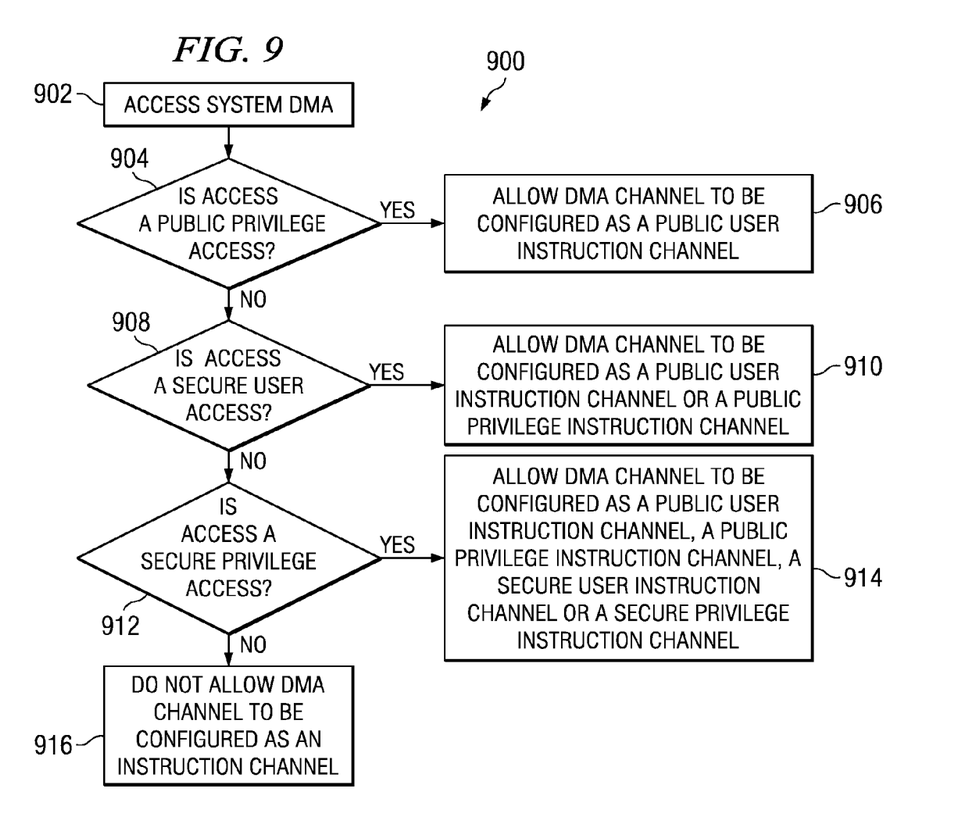

As shown in FIG. 9, a method 900 comprises accessing a system DMA (block 902). If an access is determined to be a public privilege access (determination block 904), the method 900 allows a DMA channel to be used as a public user instruction channel (block 906). If an access is determined to be a secure user access (determination block 908), the method 900 allows a DMA channel to be used as a public user instruction channel or a public privilege instruction channel (block 910). If an access is determined to be a secure privilege access (determination block 912), the method 900 allows a DMA channel to be used as a public user instruction channel, a public privilege instruction channel, a secure user instruction channel or a secure privilege instruction channel (block 914). If an access is determined to be neither a public privilege access, a secure user access, or a secure privilege access (determination blocks 904, 908, 912), the method 900 does not allow a DMA channel to be used as an instruction channel (block 916).

The above discussion is meant to be illustrative of the principles and various embodiments of the present invention. Numerous variations and modifications will become apparent to those skilled in the art once the above disclosure is fully appreciated. For example, the methods described previously may implement a locking mechanism before or after a DMA channel is configured. The locking mechanism may restrict configuration of a DMA channel or restrict changes to a DMA channel after a valid configuration occurs. It is intended that the following claims be interpreted to embrace all such variations and modifications.

What is claimed is:

1. A system, comprising:
    a processor;
    a direct memory access (DMA) subsystem coupled to the processor;
    a component coupled to the DMA subsystem via an interconnect employing security rules, wherein, if the component requests a DMA channel, the DMA subsystem determines whether the request to access the DMA channel is a public access or a secure access;
    wherein if the request is a secure access the DMA subsystem allows the DMA channel to be configured as either a secure channel or a public channel; and
    wherein if the request is a public access the DMA subsystem allows the DMA channel to be configured as a public channel but not a secure channel.

2. The system of claim 1 wherein the security rules are associated with interconnect qualifiers selected from the group of qualifiers consisting of:

a secure qualifier that indicates if a DMA channel request is made in a secure mode;
a debug qualifier that indicates if a DMA channel request is made in a debug mode;
a privilege qualifier that indicates if a DMA channel request is made in a privilege mode; and
an instruction qualifier that indicates if a channel is to be used for transferring data to an executable memory space.

3. The system of claim 1 wherein the DMA subsystem selectively configures a DMA channel as a debug channel if the DMA channel request is one of a debug mode access and a functional mode access.

4. The system of claim 1 wherein the DMA channel is selectively used to transfer data to one of a non-executable memory space and an executable memory space based on an instruction qualifier.

5. The system of claim 1 wherein the DMA channel can be used as an instruction channel selected from the group of instruction channels consisting of:
a public user instruction channel if the DMA channel request is one of a public privilege mode access, a secure user mode access, and a secure privilege mode access;
a public privilege instruction channel if the DMA channel request is one of a secure user mode access and a secure privilege mode access;
a secure user instruction channel if the DMA channel request is a secure privilege mode access; and a secure privilege instruction channel if the DMA channel request is a secure privilege mode access.

6. The system of claim 1 wherein the DMA subsystem asserts a security violation signal if at least one security violation occurs, the security violations selected from the group consisting of:
a public user mode access attempting to configure a DMA channel as a public privilege channel; one of a public user mode access and a public privilege mode access attempting to configure a DMA channel as a secure user channel;
one of a public user mode access, a public privilege mode access, and a secure user mode access attempting to configure a DMA channel as a secure privilege channel;
a debug mode access attempting to configure a DMA channel as a functional channel;
a public user mode access attempting to configure a DMA channel as a public user instruction channel;
one of a public user mode access and a public privilege mode access attempting to configure a DMA channel as a public privilege instruction channel;
one of a public user mode access, a public privilege mode access, and a secure user mode access attempting to configure a DMA channel as a secure user instruction channel; and
one of a public user mode access, a public privilege mode access, and a secure user mode access attempting to configure a DMA channel as a secure privilege instruction channel.

7. A method, comprising:
accessing a direct memory access (DMA) subsystem;
determining if the access is a public access or a secure access;
if the access is a secure access configuring a DMA channel as either a secure channel or a public channel;
if the access is a public access configuring the DMA channel as a public channel, but not a secure channel; and locking a DMA channel's use of qualifiers during a DMA channel operation and unlocking a DMA channel's use of qualifiers after the DMA channel operation is completed.

8. A system, comprising:
a processor,
a direct memory access (DMA) subsystem coupled to the processor; and
a component coupled to the DMA subsystem via an interconnect employing security rules, wherein, if the component requests a DMA channel, the DMA subsystem is enabled to determine whether the request to access the DMA channel is a user access or a privilege access;
wherein if the request is a privilege access the DMA subsystem allows the DMA channel to be configured as either a privilege channel or a user channel; and
wherein if the request is a user access the DMA subsystem allows the DMA channel to be configured as a user channel but not a privilege channel.

9. A system, comprising:
a processor;
a direct memory access (DMA) subsystem coupled to the processor; and
a component coupled to the DMA subsystem via an interconnect employing security rules, wherein, if the component requests a DMA channel, the DMA subsystem determines whether the request to access the DMA channel is a functional access or a debug access;
wherein if the request is a functional access the DMA subsystem allows the DMA channel to be configured as either a functional channel or a debug channel; and
wherein if the request is a debug access the DMA subsystem allows the DMA channel to be configured as a debug channel but not a functional channel.

10. A system, comprising:
a processor;
a direct memory access (DMA) subsystem coupled to the processor, and
a component coupled to the DMA subsystem via an interconnect employing security rules, wherein, if the component requests a DMA channel, the DMA subsystem determines whether the request to access the DMA channel includes a qualifier for data accesses or instruction accesses;
wherein if the request includes a qualifier for instruction accesses, the DMA subsystem allows the DMA channel to be used as either a data channel or an instruction channel; and
wherein if the request includes a qualifier for data accesses, the DMA subsystem allows the DMA channel to be used as a data channel but not an instruction channel.

11. A system, comprising:
a processor,
a direct memory access (DMA) subsystem coupled to the processor, and
a component coupled to the DMA subsystem via an interconnect employing security rules, wherein, if the component requests a DMA channel, the DMA subsystem determines whether the request to access the DMA channel is a public privilege access;
wherein if the request to access the DMA channel is determined to be a public privilege access the DMA subsystem allows the DMA channel to be configured as a public user channel or a public privilege channel;

wherein if the request to access the DMA channel is determined to not be a public privilege access, determining if the request to access the DMA channel is a secure user access;

wherein if the request to access the DMA channel is determined to be a secure user access the DMA subsystem allows the DMA channel to be configured as a public user channel, a public privilege channel or a secure user channel;

wherein if the request to access the DMA channel is determined to not be a secure user access, determining if the request to access the DMA channel is a secure privilege access;

wherein if the request to access the DMA channel is determined to be a secure privilege access the DMA subsystem allows the DMA channel to be configured as a public user channel, a public privilege channel, a secure user channel or a secure privilege channel;

wherein if the request to access the DMA channel is determined to not be a secure privilege access, the DMA subsystem allows the channel to be configured as a public user channel.

12. A system, comprising:

a processor;

a direct memory access (DMA) subsystem coupled to the processor, and a component coupled to the DMA subsystem via an interconnect employing security rules, wherein, if the component requests a DMA channel, the DMA subsystem determines whether the request to access the DMA channel is a public privilege access;

wherein if the request to access the DMA channel is determined to be a public privilege access the DMA subsystem allows the DMA channel to be configured as a public user instruction channel;

wherein if the request to access the DMA channel is determined to not be a public privilege access, determining if the request to access the DMA channel is a secure user access;

wherein if the request to access the DMA channel is determined to be a secure user access the DMA subsystem allows the DMA channel to be configured as a public user instruction channel or a public privilege instruction channel;

wherein if the request to access the DMA channel is determined to not be a secure user access, determining if the request to access the DMA channel is a secure privilege access;

wherein if the request to access the DMA channel is determined to be a secure privilege access the DMA subsystem allows the DMA channel to be configured as a public user instruction channel, a public privilege instruction channel, a secure user instruction channel or a secure privilege instruction channel;

wherein if the request to access the DMA channel is determined to not be a secure privilege access, the DMA subsystem does not allow the channel to be configured as an instruction channel.

* * * * *